INVENTOR:
ROBERT WALTER REICH
BY Arthur Schwartz
HIS ATTORNEY

United States Patent Office 3,605,401
Patented Sept. 20, 1971

3,605,401
ELECTRONICALLY POWERED CLOCK
Robert Walter Reich, Via Noseda 8,
CH-6977 Ruvigliana, Switzerland
Filed Sept. 8, 1969, Ser. No. 855,886
Claims priority, application Switzerland, Sept. 15, 1968,
13,931/68
Int. Cl. G04c 3/04
U.S. Cl. 58—28A
4 Claims

ABSTRACT OF THE DISCLOSURE

An electronically powered clock having three magnet means concentrically fixed to a balance wheel and three coils mounted respectively coaxially with the magnet means when said balance wheel is in its zero position. The series-connected outside coils serving as exciter coils for a transistor switching arrangement, the inside coil serving as drive coil for the balance wheel, and the magnet means have such dimensions and such positions with respect to each other that every magnet means coming away from one coil and simultaneously approaching neighboring coil will generate an excitation pulse and at the same time experience a drive pulse.

BACKGROUND AND OBJECTS

This invention relates to an electronically powered clock comprising a balance wheel made of ferromagnetic material and including a shaft with two parallel discs connected thereto, three stationary coils disposed around the axis of said shaft and consisting of a single drive coil and two exciter coils positioned on either side of said drive coil, three magnet means concentrically fixed to said balance wheel and having magnetic axes parallel to said shaft although with alternating direction of the magnetic flux, each of said magnet means comprising two permanent magnets of opposite polarity confronting each other and defining an axial air gap to receive one of said coils when the balance wheel is in its zero position, a D.C. voltage source, a transistor switching arrangement having the two series-connected exciter coils in its input circuit and the drive coil in its output circuit.

In a known clock of this type the two exciter coils are so dimensioned that the induced voltage is sufficient even at the lowest permissible operating voltages and temperatures, for complete modulation of the transistor. This, however, leads to an increase in power consumption, so that the economy of such electronic drives is in doubt when it comes to their installation in battery-powered clocks or watches, especially small watches.

A basic purpose of this invention is the creation of an electronically powered clock or watch in whose switching circuit there will be such a excitation voltage that silicon transistors can readily be used, without any increase in the power consumption. Furthermore, the electronic drive of this clock or watch is to be stabilizable by very simple means with respect to voltage and temperature fluctuations.

SUMMARY

This problem is solved through a clock of the above mentioned type by means of a combination of the following features: The coil system wherein the coils and the magnet means have such dimensions and such positions with respect to each other that in connection with the relative motion between the coils and the magnet means, brought about by the oscillation of the balance wheel, every magnet means coming away from one coil and simultaneously approaching a neighboring coil will generate an excitation pulse and at the same time experience a drive pulse.

DETAILED DESCRIPTION

Figure 1:
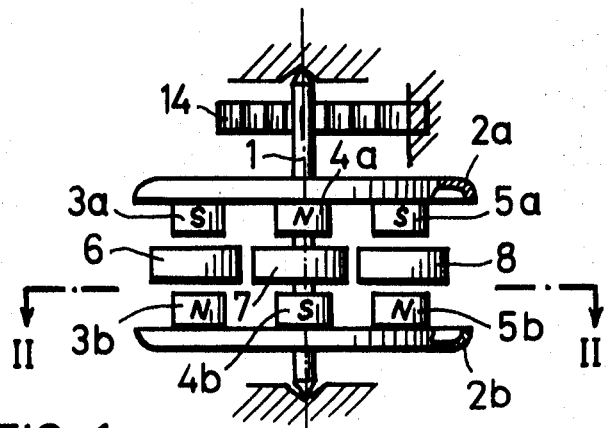
FIG. 1 is a front view of the balance wheel of a clock or watch according to the invention, as shown in the example.
Figure 2:
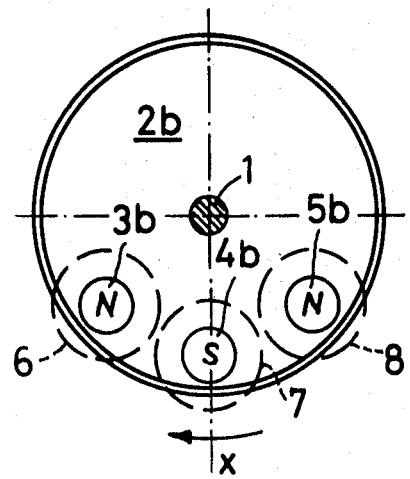
FIG. 2 is a cross-section along line II—II in FIG. 1.

The balance wheel which is illustrated in FIGS. 1 and 2, includes a balance wheel shaft 1, to which, at a distance from each other, two discs 2a and 2b, consisting of thin sheet metal, are connected in a manner rigid against twisting. To make sure that the discs 2a and 2b will be sufficiently rigid in spite of the thinness of the material, they are pressed in the form of a bowl or cup. On opposite sides of discs 2a and 2b there are attached three magnet pairs 3a/3b, 4a/4b and 5a/5b, which are magnetized in the direction of balance wheel shaft 1, although in such a manner that the magnetic flux alternately runs in the opposite direction. Since discs 2a and 2b consist of sheet metal (or some other ferromagnetic material) and since the balance wheel shaft 1, which likewise consists of ferromagnetic material, finishes the magnetic circuit, we are dealing with an astatic magnetic system in the case of the three magnet pairs 3a/3b, 4a/4b and 5a/5b. This system co-operates with a coil system that is arranged in a stationary fashion in the air gap. This coil system consists of coils 6, 7, and 8. When the balance wheel is in the zero position, as illustrated in FIGS. 1 and 2, the coil axes run in the axial direction of the magnet pairs 3a/3b, 4a/4b and 5a/5b. The coils 6 and 8 represent exciter coils while coil 7 serves as the drive coil. Drive coil 7, with its associated magnet pair 4a/4b, lies along the zero axis and, in a position symmetrical thereto, are the exciter coils 6 and 8 with their respectively associated magnet pairs 3a/3b and 5a/5b. According to the invention, coils 6, 7, 8 and their respectively associated magnet pairs 3a/3b, 4a/4b and 5a/5b, have such dimensions and have such positions with respect to each other that, in connection with the relative motion between the coil system and the magnet system, brought about by the oscillation of the balance wheel, every magnet coming away from one coil and simultaneously entering the region of the neighboring coil, produces an exciter pulse and at the same time receives a drive pulse. If, for example, the balance wheel swings in the direction of arrow $x$ and if, as a result, the magnet pair 3a/3b, coming away from coil 6, generates an exciter pulse, the magnet pair 4a/4b experiences a repelling drive pulse as it comes away from coil 7. However, since at the same time it approaches coil 6, it generates in that coil at the same time an exciter pulse, because of the magnetic flow direction which is reversed with respect to magnet pair 3a/3b. In this way the magnets support each other in each vibration direction in terms of excitation and drive. Spiral spring 14 endeavors to turn the balance wheel back into the zero position after the balance wheel has swung out in one direction.

Figure 3:
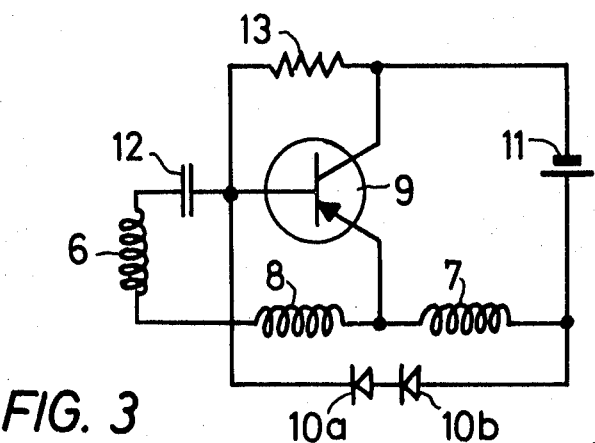
FIG. 3 is a diagram of the transistor switch arrangement for the balance wheel of FIGS. 1 and 2.

As we can see from the switching diagram shown in FIG. 3, the exciter coils 6 and 8, which are located in the input circuit of transistor 9, are connected in series. The drive coil 7, which is located in the output circuit of transistor 9, is connected in series with these exciter coils 6 and 8. In order to render the clock or watch self-starting the galvanic connection between the exciter coils 6, 8 and the base of the transistor 9 is through a capacitor 12 and a resistance 13 is connected between said base and the collector of the transistor 9, said collector being directly connected with the battery 11. For the purpose of full stabilization against the influence of voltage and temperature changes, the capacitor 12, the exciter coils 6, 8, and the drive coil 7 are bridged by two series connected diodes 10a and 10b. As a result, the working voltage and the exciter voltage are determined once and for all independently of the temperature and of the feed voltage of battery 11 because both characteristics counteract each other.

The design according to this invention creates an extremely accurate clock which can also be economically built with an integrated switching arrangement. This clock is furthermore very simple to make and does not require any adjustment. As a result of the double utilization of all magnets, both for excitation and for drive, the power consumption is reduced to a small fraction of previous power consumption. The exciter voltage is so high that silicon transistors can readily be used. As a result of the cumulative effect of the magnets, there is a possibility of using even very tiny magnets with a height of only 0.5 mm. and a diameter of only 2–3 mm. As a result, the structural height of the balance wheel and therefore the height of the entire watch becomes extraordinarily low.

The invention is, of course, not confined to the example described and illustrated here. For example, the basic principle behind the invention could also be used for pendulum clocks. Furthermore, instead of a p-n-p transistor, one could just as well use a n-p-n transistor, in which case one would, of course, have to take into consideration the corresponding changes in the switching arrangement.

I claim:

1. In an electronically powered clock or watch comprising a balance wheel made of ferromagnetic material and including a shaft with two parallel discs connected thereto, three stationary coils disposed around the axis of said shaft and consisting of a single drive coil and two exciter coils positioned on either side of said drive coil, three magnet means concentrically fixed to said balance wheel and having magnetic axes parallel to said shaft although with alternating direction of the magnetic flux, each of said magnet means comprising two permanent magnets of opposite polarity confronting each other and defining an axial air gap to receive one of said coils when the balance wheel is in its zero position, a D.C. voltage source, a transistor switching arrangement having the two series-connected exciter coils in its input circuit and the drive coil in its output circuit, the improvement consisting in that the coils and the magnet means have such dimensions and such positions with respect to each other that in connection with the relative motion between the coils and the magnet means, brought about by the oscillation of the balance wheel, every magnet means coming away from one coil and simultaneously approaching a neighboring coil will generate an excitation pulse and at the same time experience a drive pulse.

2. A clock or watch according to claim 1 wherein the galvanic connection between the exciter coils and the base of the transistor is through a capacitor and a resistance is connected between said base and the output electrode of the transistor, said output electrode being directly connected with the D.C. voltage source.

3. A clock or watch according to claim 1 wherein the discs are pressed from thin sheet metal in the form of a bowl.

4. A clock or watch according to claim 2 wherein the capacitor, the exciter coils, and the drive coil are connected in series with each other and this series connection is bridged by at least two series-connected diodes.

References Cited
UNITED STATES PATENTS

| | | | |
|---|---|---|---|
| 3,156,857 | 11/1964 | Herr et al. | 58—28 |
| 3,310,690 | 3/1967 | Reich | 58—28 |

RICHARD B. WILKINSON, Primary Examiner

E. C. SIMMONS, Assistant Examiner

U.S. Cl. X.R.

318—127; 310—36